United States Patent [19]
Whittaker

[11] Patent Number: 5,729,712
[45] Date of Patent: Mar. 17, 1998

[54] SMART FILL SYSTEM FOR MULTIPLE CACHE NETWORK

[75] Inventor: Bruce Ernest Whittaker, Mission Viejo, Calif.

[73] Assignee: Unisys Corporation, Blue Bell, Pa.

[21] Appl. No.: 592,092

[22] Filed: Jan. 26, 1996

[51] Int. Cl.⁶ .................................................. G06F 12/08
[52] U.S. Cl. .......................... 395/449; 395/455; 395/461; 395/471
[58] Field of Search .................................. 395/455, 460, 395/461, 471, 449

[56] References Cited

U.S. PATENT DOCUMENTS 5,551,001  8/1996  Cohen et al. ........................... 395/449
5,577,227  11/1996  Finnell et al. ........................... 395/449
5,584,013  12/1996  Cheong et al. ........................... 395/449
5,584,014  12/1996  Nayfeh et al. ........................... 395/461

Primary Examiner—Tod R. Swann
Assistant Examiner—Reginald G. Bragdon
Attorney, Agent, or Firm—Alfred W. Kozak; Mark T. Starr; Steven R. Petersen

[57] ABSTRACT

An optimization system for the cache-fill operation in a multi-set cache memory operates to select that cache-set which indicates it has invalid data therein and/or also indicates that an associated upper level cache has correspondingly invalid data. When no data invalidity is indicated, then a random counter is used to arbitrarily select an address for one set of the multiple-set cache units for the data-fill operation.

7 Claims, 9 Drawing Sheets

V = 0   (INVALID DATA)   (2nd LEVEL)
V = 1   (VALID DATA)     (2nd LEVEL)
R = 0   (INVALID DATA COPY AT 1st LEVEL)
R = 1   (VALID DATA COPY OF 1st LEVEL)

SMART FILL SYSTEM FOR MULTIPLE CACHE NETWORK

FIELD OF THE INVENTION

This disclosure relates to systems for computer processors using sets of multiple cache unit structures which enhance the cache hit rate while also optimizing the cache-fill cycle.

BACKGROUND OF THE INVENTION

A general simplified picture of a computer system is shown in FIG. 2. This indicates a central processing module 10, a main system memory module 40 and an Input/Output module 50 all connected together with dual system busses 22a and 22b.

FIG. 3A is a drawing showing the Central Processing Module 10 having a processor 14 connected to a cache memory module 19 using the processor bus 14b in order to enhance system performance of the processor. Whenever processor 14 requires data from the main memory 40, the cache memory 19 is the first line of resource for this data. A good cache design will, on average, contain the desired information for the processor, about 90% of the time. If the cache memory 19 does not have the required information in its latest, most valid state, then the required data will be accessed from the system main memory 40 over a system bus mechanism, such as 22 in FIG. 3A. The latter requirement to access from main memory 40 is, of course, much slower, in time, than the preferred access from the cache memory utilizing a "cache hit".

FIG. 3B illustrates the basic elements in the Central Processing Module block 10. Here, the processor 14 utilizes a first level cache memory 19c1 and a second level cache memory 19c2, which is connected via the internal processor bus 14b. The internal processor bus 14b also connects to the data path array 20 which provides an interface to the dual system busses 22a and 22b. The control of operations is accomplished by a programmable array logic device designated Control PAL 16. In FIG. 3B, the cache module 19 of FIG. 3A is shown as two separate modules, one of which is designated as the first level cache 19c1 which is internally part of the processor 14. The second level of the cache memory module 19c2 is shown connected via the internal processor bus 14b. The system of FIG. 3B may also include snooping or spy logic 22s which senses any write operations that may alter memory data so that any stale data in cache 19 (19c1, 19c2) can be indicated as invalid via a V bit=0.

In order to gain higher system performance, this double-level architecture of cache is often used. When the processor 14 needs memory data, the first level cache 19c1 is the first resource for the processor. If the first level cache does not have the information requested, then the second level cache 19c2 is used for access to the required memory data. Finally, if neither one of the cache modules have the data needed by the processor, then the much slower path to the main system memory 40 is used through the data path array 20 and system busses 22a, 22b.

Typically, the first level cache 19c1 is quite small and may be integrated right into the processing chip 14. However, the second level cache 19c2 is typically much larger in storage capacity and will generally be external to the processor 14 as seen in FIG. 3B. The present system described herein will primarily be focused on the second level cache logic 19c2.

FIG. 3C expands the view of the second level cache memory design in order to show some of the specific elements of the cache memory module 19. The processor bus 14b has an address bus 14ba and a data bus 14bd. The address bus connects to the Tag RAM 19ta while the address bus and the data bus connect to the Data RAM 19da. A programmable array logic cache control unit 16cc is connected to both the Tag RAM and the Data RAM. This cache control unit 16cc is a part of the overall control PAL 16 shown in FIG. 3B. The Tag RAM unit 19ta in all cache designs, holds the addresses (indexes) of the data contained within the cache Data RAM 19da at any particular moment in time. The Tag RAM 19ta provides the means by which the processor-request address values are compared with addresses held in the Tag RAM 19ta. When a match in address occurs, this is called a "cache hit", since it indicates that, that particular address does indeed contain the valid data for the address specified by the processor 14.

The Data RAM block unit 19da (FIG. 3C) is the storage area for all of the data held within the cache module at any given moment. The Data RAM is generally an expensive, very fast Random Access Memory (RAM) device, that can return requested data to the processor on a "cache hit" condition. The Cache Control unit 16cc monitors the Tag RAM "hit" condition and the reading out of the Data RAM 19da. When a Tag "miss" condition occurs (i.e., not a "hit"), the Control Unit 16cc controls the "writing" into the Data RAM 19da of any data which is subsequently received from main memory 40. It should be indicated that this latter activity, when a "miss" occurs and data is accessed from main memory 40, has an operational cycle and this particular cycle is called "filling" the cache memory. This type of "filling" operation cycle is the focus of the present system and method.

In order to gain higher cache "hit" rates, on the order of 90% "hits" and above, it has been found that special structuring of the cache data into several groups or several banks of data is a very effective method. These groups or banks of data are often referred to as "sets" or "ways". FIG. 4 shows an expanded architecture of the Data blocks and the Tag blocks to illustrate them as a four-set type of cache structure. Here, the Data RAM 19da is constructed into four separate data groups or sets designated 19d0, 19d1, 19d2, and 19d3. For a 64K word cache, the data will be grouped into four cache sets each of which will hold 16K words. Only one of the four sets will contain the data for any given address at any given time. Thus, for a cache "hit", only one of the four sets of the data RAM 19da will be enabled to drive data onto the internal processor bus 14b back to the processor 14. Further, as indicated in FIG. 4, each address location in each data set (19d0, 19d, 19d2 and 19d3) will hold 4 words designated $W_1$, $W_2$, $W_3$, $W_4$.

in FIG. 4, each of the data sets has its own Tag RAM facility where four Tag RAMs are shown as 19t0, 19t1, 19t2, and 19t3. Each Tag RAM holds 4K addresses, that is to say such that each of the 4,000 addresses contained in a Tag RAM will each point to a four-word block in the Data RAMs. Thus, each address location in the Data RAMs 19da actually holds four words designated W1, W2, W3 and W4. With the multiple sets (four sets in this instance), only one set is allowed to contain a given address value and therefore produce a "hit" condition at any given time. The Tag set that produces the "hit" will select its data RAM 19da to drive the required data onto the processor 14. The basic desire is to organize the system in order to maximize the number of cache "hits". However, in order to have "hits", the cache module must have previously been written into with good data from the main memory 40. That is to say, the cache memory must have previously been "filled" (written into). When the cache does not get a "hit condition" for a processor data-read operation, it is said that the cache had a "miss" condition. On cache "misses" the data requested by the processor is obtained from the main memory 40 via the data path array 20 and system busses 22a and 22b. Then the requested data is returned to the processor 14 by the route shown in FIG. 3B (system busses 22a, 22b and data path array 20).

The same "miss" data will then be written also into the cache data RAMs 19da and this "writing" into the data RAMs is called the "filling" process. Not only is the data written into the Data RAMs 19da, but the corresponding Tag RAM 19ta for that Data RAM set, must also be written into with the appropriate address. The address value for the data in question is written into the Tag RAM 19ta and is also marked as "valid" (V bit=1) in the Tag RAM 19ta. The next time the processor 14 requests to read that specific address, the Tag RAM 19ta will give a "hit" and the appropriate data will be transferred immediately from the Data RAM 19da to the processor 14. The "filling" process used in multiple set caches and the optimization thereof is a major focus of the present system and method.

SUMMARY OF THE INVENTION

A computer network having first and second level cache memories involves a cache architecture using multiple-sets (or ways) of cache storage units where each set has N addresses in which each address holds four words. Each cache set in the second level cache, has a Tag RAM and an associated Data RAM. Each Tag RAM holds the address of data in the Data RAM in addition to holding, for each location in cache, a set of status bits V and R. The V bit indicates the validity (V=1) or invalidity (V=0) of the data at each address in the second-level cache. The R bit provides status information in the second level cache to indicate that a copy of the same data resides in the first level cache and is valid (R=1) or invalid (R=0).

The improved system and method for the computer network provides an optimal method and system for selecting which set of the multiple set second level and first level cache will be chosen for a fill-operation (that is, to be written into) after a miss cycle in the cache. The improved cache-fill cycle acts first to select that particular cache set having invalid data (V=0) in the second level cache, then acts second to select that cache set having invalid, second level cache data (V=0) and 1st level cache invalid data (R=0). If no invalid data is noted in the second level and first level cache, then a random count generator is used to randomly select one set of the multiple cache sets as candidate for the fill-operation after a cache miss.

DESCRIPTION OF PREFERRED EMBODIMENT

Figure 3A:
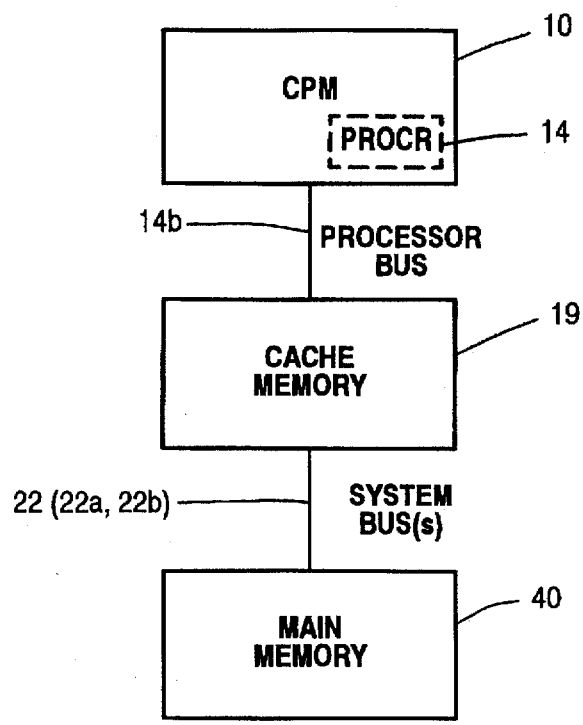
FIG. 3A is a drawing showing the relationship between a Central Processing Module, a cache memory and main memory.
Figure 3B:
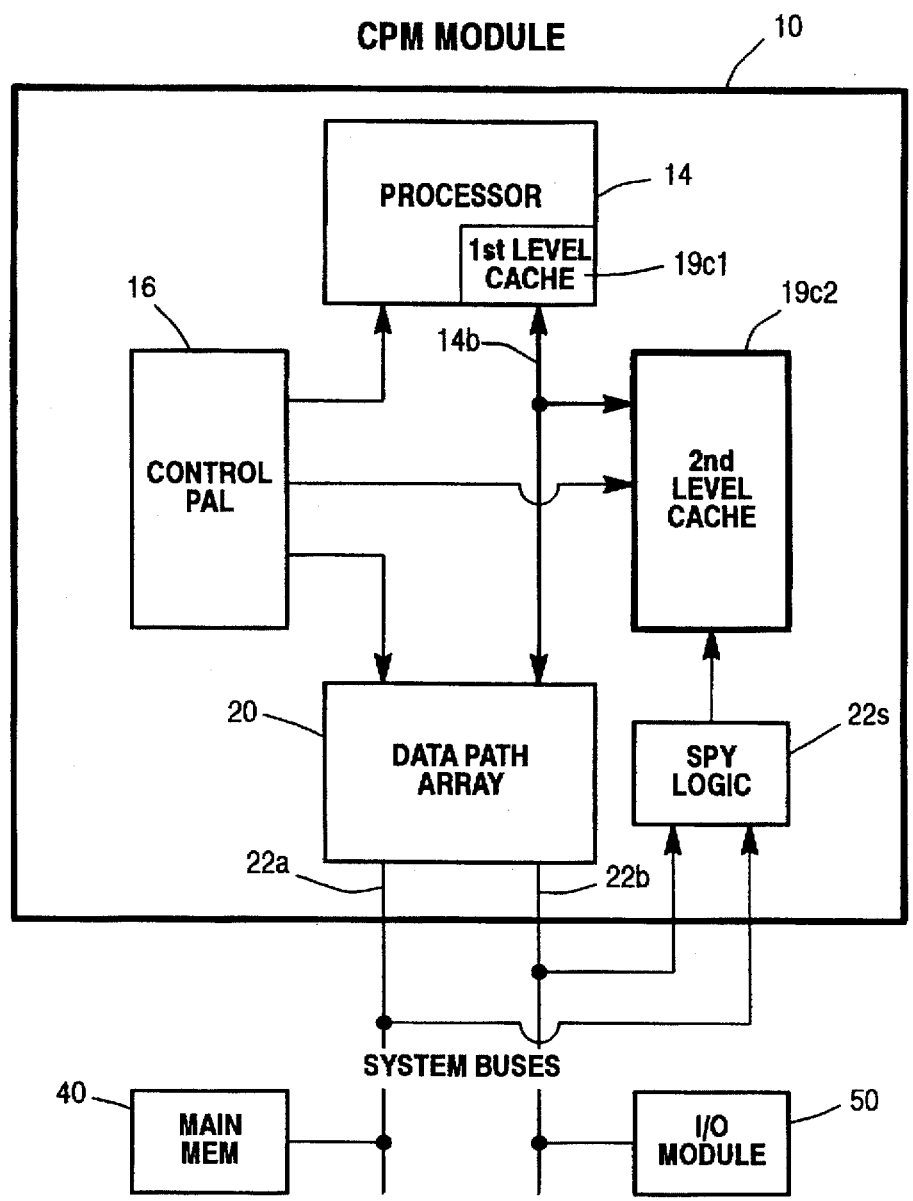
FIG. 3B is an expanded view of the modules in a Central Processing Module.
Figure 3C:
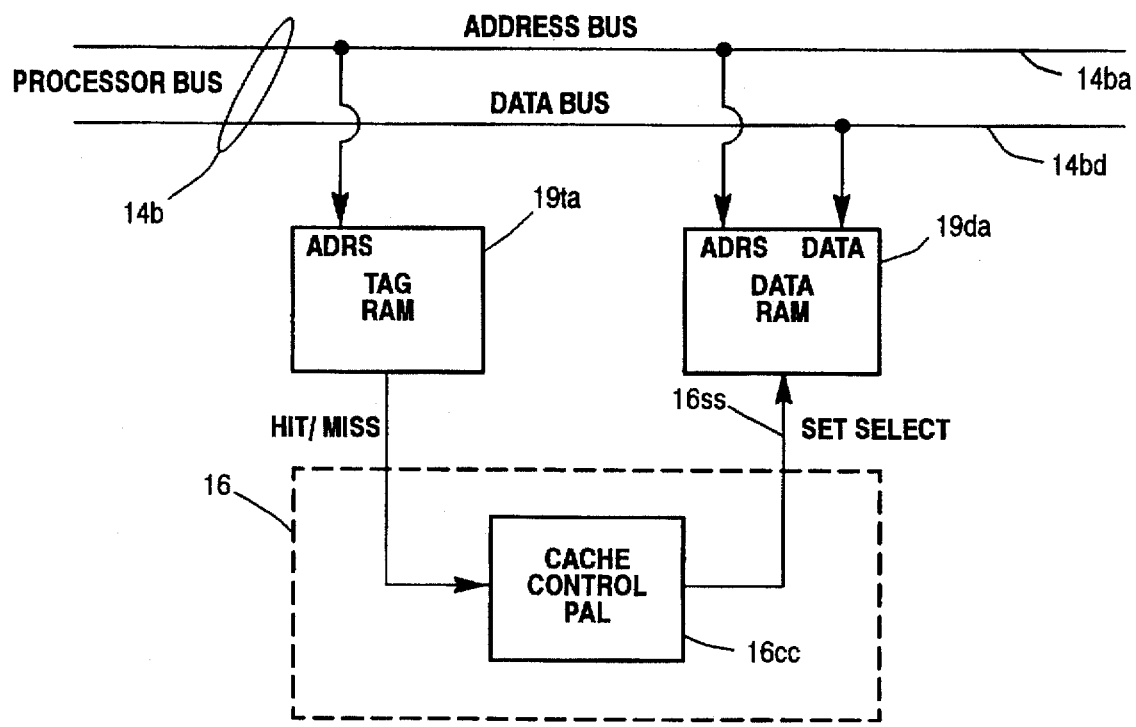
FIG. 3C is a drawing showing the elements involved in a cache memory module.
Figure 4:
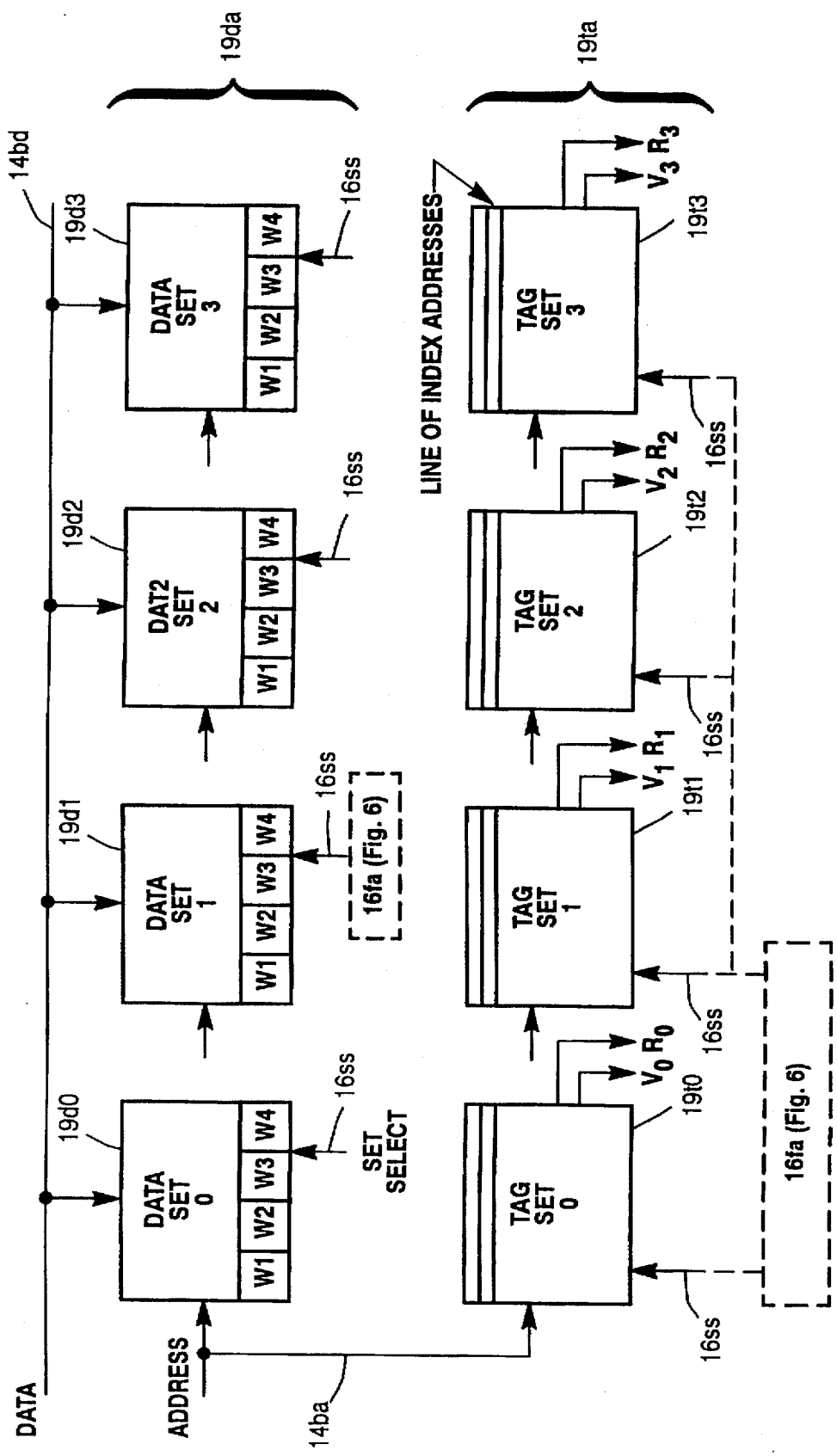
FIG. 4 is a drawing of a set or way of multiple units constituting the data RAM and multiple units constituting the Tag RAM of a cache memory module.

When a multiple set structured cache, such as seen in FIG. 4, must be filled with new data values and new address values, the cache controlling logic 16cc (FIG. 3C) must make a logical decision. One decision is: into which of the four sets of the cache memory shall the new data be written? Here, there have been several methodologies known which are available in making this decision. One of these is called the "Least-Recently-Used" (LRU) method. In this technique, there is added a number of extra storage bits to the Tag RAM memory 19da. These LRU bits keep track as to which of the four sets of data has been "Least-Recently-Used". Then when a "fill" into the cache memory is required, the LRU bits are investigated and then the set that is "least" recently used will then be selected for the filling-in of the new data. This is a workable method, but it does add significantly to the size (width) of the Tag RAM devices 19da.

There is another significant method used by the industry which involves a "Random" fill algorithm. This method chooses which one of the four sets into which to write new data on a "random count" basis. Here, some sort of "random counter" is designed that provides a count alternatively specifying each one of the four sets. That is to say, the count will equal 00, 01, 10, or 11, which operates "randomly" to the cache operations. Thus, depending on the random counter value at a given period of time, it is that particular data set which will have the new data placed into it. The cache system and method provided in the present system uses, to some extent, the random fill method, but adds into it a simple "smart" algorithm in order to enhance the fill-cycle efficiency.

A random count might be approximated in several ways, and in the present system, a free-running counter operating at a clock frequency asynchronous to the cache logic is utilized. This relatively simple method creates a pseudo-random number of 00, 01, 10, or 11, which number is used to point to the particular cache set to be filled. Thus, in FIG. 4, the set select 16ss line can be used to select a particular one of the multiple Tag sets and Data sets involved. By definition, a "random number set" is one where any of the numbers (counts) has an equal probability of occurrence at any given instant. In the present system the asynchronous aspect use here assures the use of a "random-like" count.

It would be possible to simple use only the random count value to provide the "fill decision" as to which of the four data sets (19d0, 19d1, 19d2, 19d3) to fill on any given "miss" operation cycle. This method would give a slightly lower hit rate than the LRU method, but would apparently be adequate for most applications. The present system and method provides an additional feature to be described, where there is incorporated, with the random count usage, a system for increasing the "fill" efficiency. The added feature comes with virtually no additional hardware cost since it can be implemented in spare areas of a currently existing high speed programmable array logic device (PAL) used in the system.

In regard to the concept of fill efficiency, it may be remarked that computer activities tend to operate in cyclic patterns. Thus, a given task will access some given range of memory addresses repeatedly in some looping type of manner. Then some other task may tend to have its group of addresses in some other area of memory. It is this very real tendency that makes cache memory concepts operate with efficacy to a computer performance. The basic idea is that since a given computing task will tend to stay in a block of memory (which may be quite large), that the first time through the loop, the data will not be in the cache structure, that is, it will lead to misses. Then this data will be retrieved from the main memory and later filled into the cache memory. On subsequent loops, whether reading or writing into the memory address location, the data will then be "local" in the cache unit. At this time the processor can get nearly instant access to the desired information.

It would be most undesirable, if each time a new word is filled into the cache unit from main memory, that the new word were written into a currently useful filled cache location. Thus, the LRU method tries to stay away from sets that have been recently used. However, the random method relies on a probability having some confidence that good (current) data areas will not be the areas "overwritten" by the next word retrieved from main memory 40. The higher or better the probability that current good data (already in the cache) is not overwritten, might be thought of as the "fill efficiency". Thus, the working idea here is—not to wipe out currently useful data which is in the cache memory with new data being brought into the cache memory from the main memory.

Tag Ram Status Bits: One type of status bit used for the Tag RAM 19ta is the "valid" indicator status bit "V". No matter what the fill method or concept is used, each location of the Tag RAM 19ta must provide some "status" information along with the address information that is stored. At least one bit of status information is required, at a minimum, by all cache Tag structures. As indicated, this would be the "Valid" or V bit status indicator. This status bit indicates whether the address in the Tag RAM at that address location, is a current, real, valid address. That is to say, it answers the question, is there really a currently good data word held in the data RAM 19da associated with the same Tag address?

It will be seen that, at initialization time (when the machine is first started up), no data has yet been written into the cache data RAMs 19da. All the data is therefore "not-valid". Therefore, the Tag RAM facility for the cache memory must have all of the valid status bits "V" placed in the "off" state (V=0). Then, as data from main memory 40 is "filled" into the cache data RAMs 19da, the Tag RAM 19ta is also filled with the correct corresponding address information. And the "Valid" status bit is turned "on" (V=1) to show that this data is now considered valid and good.

At subsequent times in the system operation, other system modules, for example, a second processor or a second input/output module, may write new data into given addresses that are currently marked as "Valid" in the cache memory. Here, a process called "snooping" (or spying) occurs and the cache will then turn "off" (V=0) its valid status bit for that particular address location. Therefore, until that cache memory location is subsequently re-filled with some other new data, then that location is considered to be no longer valid, that is to say, invalid. Thus, it can be seen, at a minimum, a valid type status bit in the Tag RAM 19ta is required.

LRU Status Bits: If a Least-Recently-Used (LRU) type of fill-algorithm were used, then several extra bits of information in FIG. 5 would be required to be held in a Tag RAM directory along with the valid status bits and the address information. This, of course, will have considerable hardware impact, since the Tag RAM structure must now be wider by some 4 to 6 bits. Additionally, the need for LRU bit generation and evaluation logic is then required, which complicates the issue. The present system and method does not require use of the LRU methodology.

Figure 5:
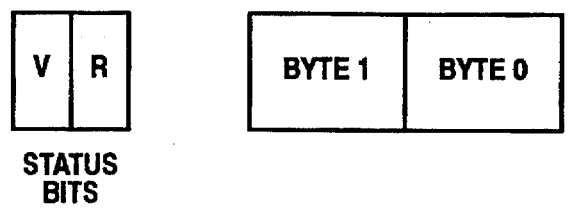
FIG. 5 shows the composition of each particular set of data in the Tag RAM indicating two bytes of address data and two bits of status data.

Reflection Status Bit: A second bit of status information is included with the Valid bit in the Tag RAM of the present system here described. FIG. 5 is a drawing which shows the layout of the bits stored in the Tag RAM 19ta. The Tag RAM device used in this illustration is 18 bits wide. There are two bytes of 8 bits each, plus the two status bits designated "V" for Valid and "R" for Reflection. This particular structure then allows for 16 bits of the necessary address information and the two status bits V, R, as indicated. The Reflection bit designated as "R" is used in connection with the architecture of two multi-level cache memories, that is to say, a first level cache 19c1 and a second level cache 19c2 shown in FIG. 3B. Using the system with two levels of cache, the R bit reflects the valid state of data within the "first" level cache 19c1.

In the present system, the second level cache 19c2 is much larger in size than is the first level cache 19c1. The second level cache 19c2 is a "super-set" of the first level cache 19c1. This indicates that all data held in the first level cache 19c1 is also held in the second level cache 19c2, but the second level cache 19c2 holds a considerably larger amount of information than does the first level cache. In this situation it is desirable for the second level cache 19c2 control logic 16cc to know whether a particular address is also currently valid in the first level cache 19c1. The R status bit provides information within the second level cache as to whether a particularly selected address in the second level cache 19c2 is also currently valid in the first level cache 19c1.

Similarly to the situation where the Valid bit for the second level cache 19c2 indicates whether a specific location in the second level cache currently has valid data, so then the R bit indicates whether the first level cache 19c1 also currently has that particular address data in a valid condition. The following Table I shown below gives the possible combinations of the Valid Status Bit and the Reflection Status Bits (V,R).

TABLE I

POSSIBLE COMBINATIONS OF STATUS BITS V, R

| VALID bit | R bit | DESCRIPTION |
|---|---|---|
| 0 | 0 | Tag RAM location is currently not valid in both 1st and 2nd level caches. This condition will occur after a specific cache location has been invalidated by the snooping logic monitoring other system module activities. |
| 0 | 1 | Cannot happen - 2nd Level cache (VALID) always includes the 1st Level cache state. |
| 1 | 0 | 2nd Level cache at this address contains current, good, valid data, but the 1st Level cache does not contain valid data at this location. This condition will occur when the 1st Level cache has filled over previously valid locations. The 1st Level cache is much smaller than is the 2nd Level cache - it can contain only a small portion of the data in the 2nd Level. |
| 1 | 1 | Both cache levels contain current, good, valid data at the Tag RAM address location. This will occur whenever cache data is first filled into the caches. When data is first filled into the |

TABLE I-continued

POSSIBLE COMBINATIONS OF STATUS BITS V, R

| VALID bit | R bit | DESCRIPTION |
|---|---|---|
| | | caches from main memory, both cache levels initially get the same data. Later, the 1st Level cache may need to fill - over giving the case above where R = 0 and V = 1. |

Figure 6:
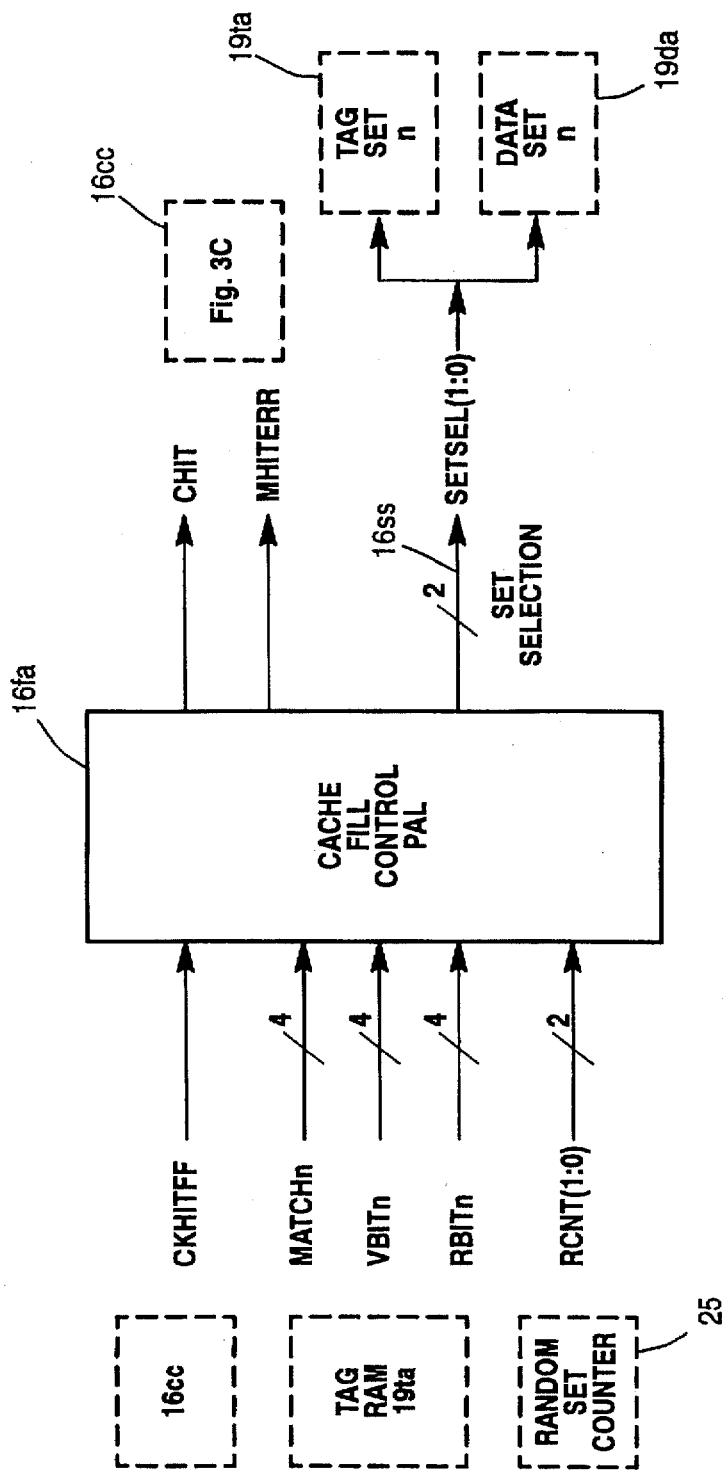
FIG. 6 is an illustration of the programmable array logic for cache fill control showing the inputs and outputs.

The use of the Valid status bit "V" and also the Reflection Status Bit "R" is used in the present system in the second level cache "fill operation" in order to implement the "smart" fill procedure involved. FIG. 6 is a diagram of the cache fill control logic block 16fa and indicates the various input signals and output signals involved. This block 16fa is part of the Cache Control PAL 16cc, FIG. 3C.

The cache fill control programmable array logic (PAL) 16fa functions to provide a cache fill procedure algorithm. Each of the signal inputs and outputs in FIG. 6 have a specified function which is discussed hereinbelow.

The input signal CKHITFF is a timing signal from the cache control logic 16cc and indicates that the other inputs are ready for this programmable array logic unit to "check for hits". This signal will enable the operative execution of actions in the programmable array logic, 16cc.

The MATCFm signal involves a 4-bit bus providing indicators from each of the Tag RAM devices indicating that the current address location is valid (V=1) in that particular Tag set. The "n" indicates one of the cache set numbers 0, 1, 2, 3. These signal inputs are used to create the cache "hit" or the cache "miss" indicators to the remainder of the cache control logic 16cc. It may be noted also that a "multi-set hit error" (MHITERR) is detected if "more than one" of the MATCHn signals are "active" at the same time.

The VBIn indicates the valid status bits out of each one of the Tag RAMs 19ta for the four cache sets. The "n" indicates the cache set numbers 0, 1, 2, 3. If the particular status bit is active (=1), then the currently addressed location is Valid in that particular set. It should be noted that a Valid "on" indicator does not necessarily mean that a match (hit) has occurred. A match requires that the incoming address and the stored address agree in addition to the Valid bit being "on" (=1). These bits are of major significance to the presently described Smart-Fill methodology.

The input signal RBITn in FIG. 6, is used to indicate the Reflection (RBITs) out of each of the Tag RAMs of the four cache sets. The "n" represents the cache set numbers 0, 1, 2, 3. If the RBIT is active (=1), then this reflects the fact that the current address location in the first level cache 19c1 is Valid for that set. These bits are also of major significance to the Smart-Fill methodology.

The input signals RCNT (1:0) refer to the random set count. These involve the two bits of the incoming signals from the random counter 25 of FIG. 6. The counter counts in binary, thus working through all of the four possible counts (00, 01, 10, 11) in a random manner. Thus, at any given instant, if the state of the counter value were interrogated, it would be found that any of the four possible counts would have an equal probability of being present. These bits are used for the random fill algorithm, shown as part of FIG. 1.

Output Signals, Cache Fill Control Logic (FIG. 6): The first output signal designated CHIT is the cache "hit" indicator for the second level cache 19c2. This signal indicates that the cache control logic 16cc at the current processor address is Valid (V=1) and is contained in the cache structure. This signal is not generally used in the presently described Smart-Fill logic, but it is built into the same, fast programmable array control logic device because the same input signals are used for other purposes.

The output signal MHITERR represents a "multi-set hit" error signal. It is used elsewhere in the cache logic to report cache errors. This signal is not used in the Smart-Fill logic aspect, but it is built into the same fast, programmable array logic device because the same input signals are used for detection of cache errors for conveyance to the Maintenance Subsystem.

The output signal SETSEL(1:0) represents the set selection signal. These signals are the binary coding of the selected cache tag set and are generated in two ways: (a) if a cache "hit" has occurred, then the MATCHn signal, (that has indicated a match in the given set), is used to create the corresponding binary set count. This set count then is used to select the corresponding cache Data RAM 19da; (b) if a cache "fill" operation is in progress, then this count is the output of the Smart-Fill logic and selects the Tag-set to be filled (written into) with new data.

Figure 7:
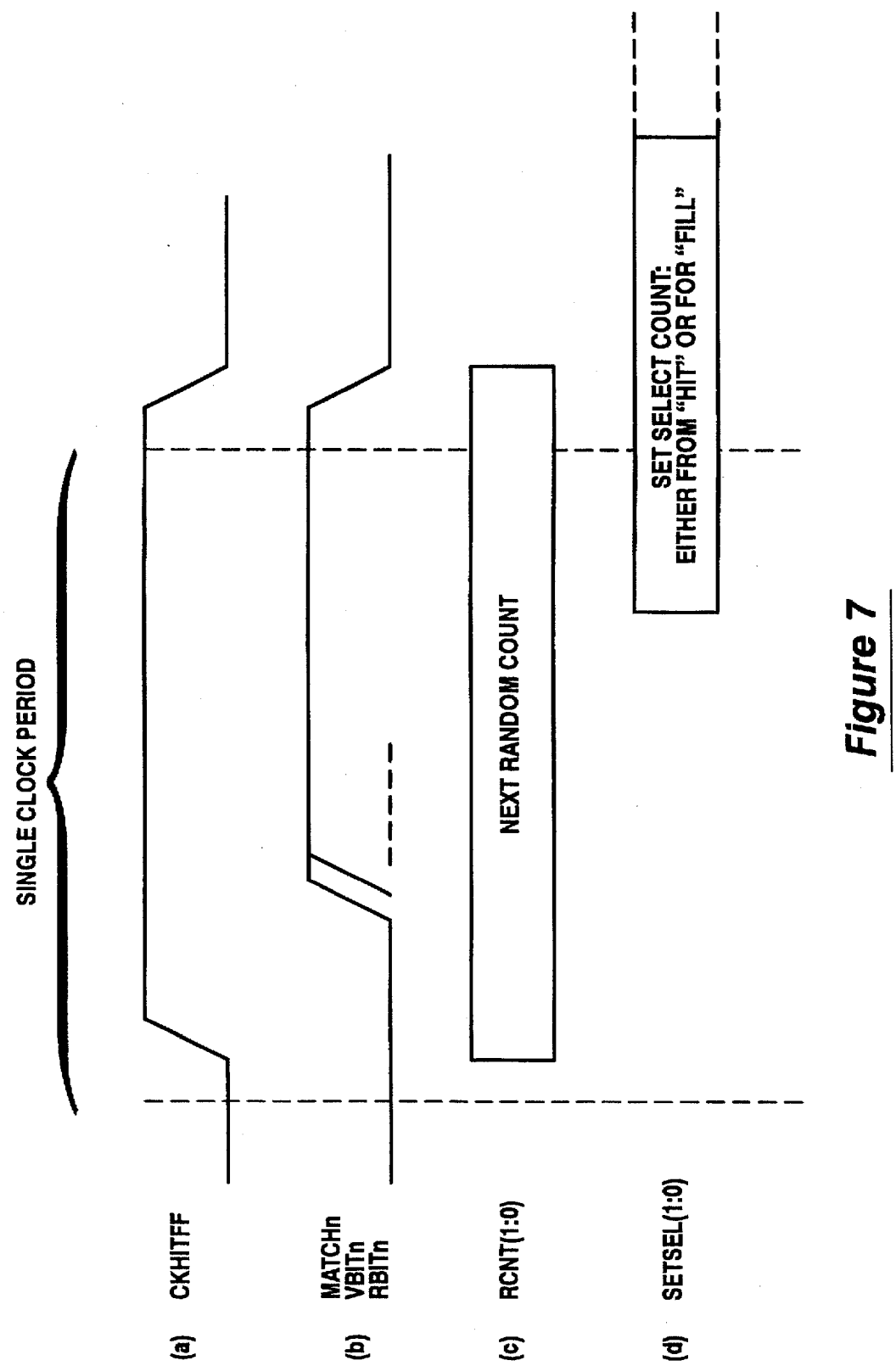
FIG. 7 is a timing diagram showing the operations occurring in a single clock period of the actions in FIG. 1 during the "miss" cycle of operation.

Smart-Fill Operations: FIG. 7 is an illustration of the timing factors involved in the cache hit indicators for the second level cache, 19c2 for the MATCHn with the VBITn and the RBITn signals as they relate to the random counter signal RCNT (1:0) and the selection of the appropriate cache Tag set, (SETSEL 1:0). It will be seen that when the signal CKHITFF (Check For Hits) is activated by the cache logic 16cc (which is monitoring the processor bus operations on bus 14b), that within a single cache clock period, the Tag RAMs are read out giving the VBITn and the RBITn values. Further, the Tag RAM 19ta will execute a comparison operation and produce the MATCKn signals if a "hit" condition has occurred on the Read access operation. With these Tag RAM signals, the programmable array logic 16fa (FIG. 6) will produce the CHIT signal if a "hit" has occurred. At the same time, the programmable array logic 16fa will produce the appropriate SETSEL value for the particular cache set having the "hit".

Further seen in FIG. 7, is the production at line (d) of the SETSEL value for the "miss" condition. This is designated as the "fill" value of SETSEL. It is at this time that the Smart-Fill process will produce the best SETSEL Value for efficiently filling of the cache with the "miss data" from the main memory 40.

Figure 1:
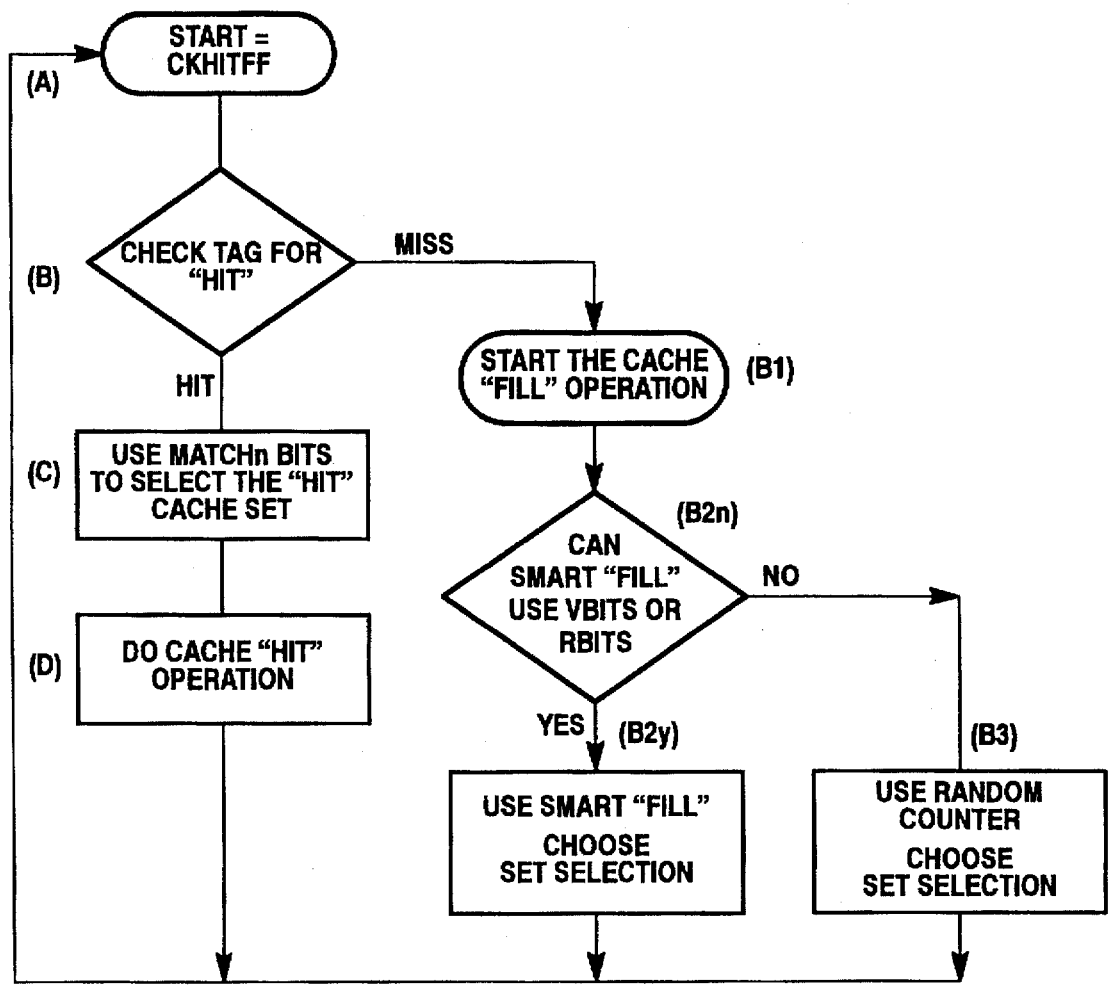
FIG. 1 is a flow chart illustrating the optimized system for filling a cache memory.

The Smart-Fill process may be illustrated by the flow diagram shown in FIG. 1. At level (A), the process starts where the CKHITFF signal initiates the sequence to check for cache hits. At level (B), the Tag cache 19ta will have its addresses checked to see if a hit occurs with the requested address from the processor. When a "hit" occurs, then at level (C) the MATCHn bits are used to select the particular "cache set having the hit". Then at level (D), the system does a cache hit operation in order to read-out the requested data from the Tag Data RAM 19da and convey the retrieved data over to the processor 14.

However, the important activity here in the flow chart of FIG. 1 involves the situation at level (B) where a "miss" occurs. In this situation, the process goes to the level (B1) which initiates the start of the cache "fill" operation. Next at level (B2n), the decision point is presented whether the "Smart-Fill" process can use the "V" bits or the "R" bits. (Valid bits or Reflection bits). If "yes" is the case, then the procedure moves to B2(y), where the Smart-Fill system operates to choose the set selection of one of the four sets of cache units in which it can use that chosen set to "fill-in" newly written data information (Write) with the least probability of overwriting any valid useful data.

On the other hand, if the process cannot use the "V" bits or the "R" bits ("no"), then the procedure goes to level (B3) where the random counter value is used to choose a particular one of the four sets which will then be filled with the newly written data and used to fill a an address location in the second level cache memory 19c2.

Thus, in summary, if there is a "miss" at level (B) of FIG. 1, then the Smart-Fill process begins at Level B1, and the system is able to provide the SETSEL values from the signal SETSEL(1:0). Then, at Level B2n (FIG. 1), the system checks to see whether locations are available for a fill because the V bit or the R bit are showing invalid data, i.e., V=0 or R=0. If so, then the smart-fill process selects those locations at Level B2y, FIG. 1 with invalid bits as a place to insert (fill-in) newly acquired data. If this cannot be done, (no) then the alternative is at the level (B3) where the random count value at that instant will be used to choose the selected set into which to fill the cache to complete the fill operation.

Smart-Fill Procedure FIG. 1: This procedure involved is the method by which the system selects which set of a multiple set cache memory will be chosen for a fill (write into) operation. Referring to the previously discussed Table I, there was seen a situation involving two bits—the Valid bit "V" and the Response bit "R". Between these two bits there are four combinations possible for the two status bits which are associated with each of the cache sets. It is the use of these status bits "V" and "R" that provides the opportunity for use of the Smart-Fill procedure. The cache-fill operation is the putting into (or writing into) the cache, of new data resulting after a "miss" operation. In this filling process, a place or location within the cache structure must be found in order to write the data. In a multiple-way (structure of FIG. 4) cache, for any given address, there are as many possible places or locations to write the new data as there are sets or ways. As seen in FIG. 4, there are four sets, so there are four possible cache sets into which new data can be written. Thus, the first task of the fill process is to pick out which one of the four sets will be written into with new memory data.

If the cache were completely empty, as in the case immediately following initialization, then any one of the four sets would be of equal advantage. However, in the situation where, once the cache contains real data, the fill process must begin to "write over" the older data which is already in the cache. Once overwritten, that particular address value will not give the processor a "hit", but will need to be retrieved from the main memory 40 if the processor 14 needs it again, since it has been deleted by being overwritten.

Figure 2:
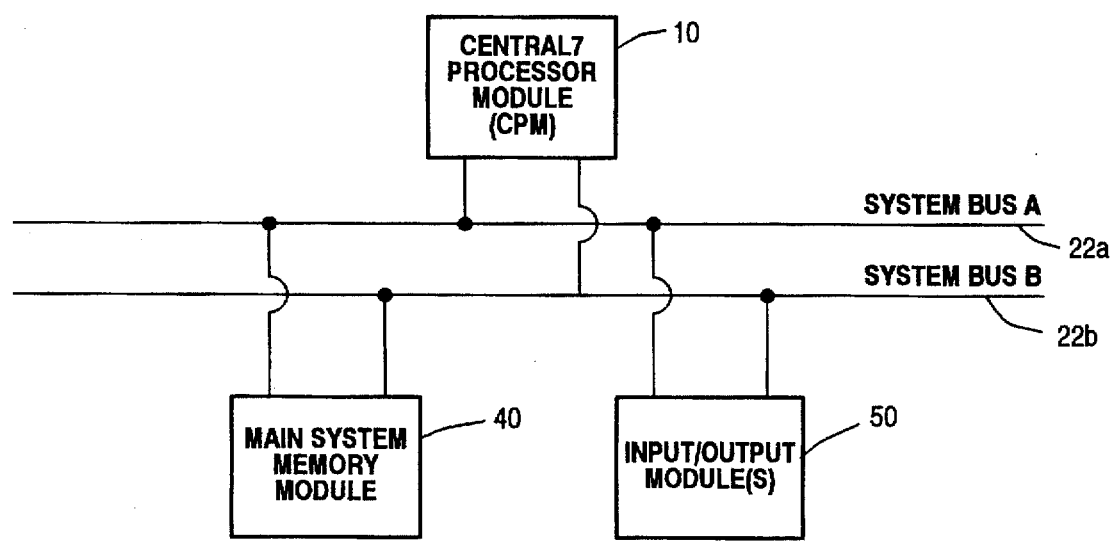
FIG. 2 is a simplified diagram of a computer system network using dual system busses.

It may be seen that since data is continuously being retrieved from and filled into the cache, that the data in the cache is in a very dynamic situation. The processor is continually using portions of the data. If the processor 14 updates the data, that is to say, writes a new value, then the cache data will be updated with a new value from the processor, as well as the main memory being updated. In a system with multiple memory access modules as seen in FIG. 2, there may be other processors and multiple I/O module processors which will also be accessing various memory addresses which possibly include addresses already within the cache areas of the first level cache 19c1 and the second level cache 19c2.

The access to these caches by other system modules in order to change the data values (to do writes of data to memory) thus forces all system cache modules to provide a "snooping" method (22s, FIG. 3B) to ensure data coherency, and to ensure that there is no location still having "stale" data and "new" data with the same address. Thus, if a system module writes to an address location that the cache already has valid data for, then the cache must invalidate that particular data address location and mark it as no longer having valid data (V=0), since there is now stale data therein. Thus, it will be seen that the cache information is very dynamic, constantly changing from empty, to valid, to invalid, to valid, to invalid and so on. The Valid status bit "V" provides the means for keeping track of the dynamic nature and changing conditions that occur at each address location in the cache.

In the system and method presented herein, the second status bit, the Reflection Bit (RBIT) provides a second level of dynamic information. This bit, the "R" bit, monitors the status of the address locations that are "also held" within the first level cache 19c1. Since the same set of operations, discussed above, also applies to the status bit "R", the RBIT will continually be "on" or "off" for the various address locations involved as well.

There is another level of change to the RBIT which occurs additionally. Whenever the processor 14 has an internal "miss" in the first level cache 19c1, it must do a "fill" operation into some location of the first level cache with the new data that it will receive after the "miss". When this occurs, a special command from the processor 14, called a "LRUTAG OP" is transferred from the processor 14 onto the processor bus 14b and then onto the second level cache 19c2. This command contains address location information as to where, in the first level cache 19c1, that the new data will be filled. This allows the second level cache 19c2 to update the RBIT in its Tag index accordingly, in order to keep the "Reflection Bit" (R) of FIG. 5, as truly reflecting the status of the first level cache 19c1.

With all the activity regarding the hits, the misses, the requests from main memory and the need to fill the cache memory units, it will be seen that the status bits, both the Valid "V" and the Reflection Bit "R", for all four sets of the second level cache 19c2, are continually changing. Because of this, a door is opened for use of the Smart-Fill method. The purpose of the Smart-Fill method may be summarized as: Whenever possible, do not write (fill) into a set (portion of cache) where valid data resides in either the first level or the second level of the cache memory module.

If the "random counter" method were to be used without the above-stated Smart-Fill goal, then for any given "fill" operation, there would always be about a 25% chance that the filling operation would be writing over currently valid data. The random count method alone, does not take into consideration whether the cache set chosen for the fill operation is valid or not. However, the presently devised Smart-Fill method does take into consideration whether a given cache set address is valid or not valid. It further considers also whether the Reflection Bit is "on" or "not on" (off). It then uses the random count selection as a last resort decision maker based on the Reflection Status bit "R".

There are several different possible situations that might occur when a "fill" decision is required. The Table II shown below shows the status bits for each of the four cache sets in several different possible situations. These situations are designated as "S1, S2, S3, S4, and S5". In Table II, each set is shown with a possible condition for the Valid bit and the Reflection bit.

TABLE II

| | SET 3 (V R) | SET 2 (V R) | SET 1 (V R) | SET 0 (V R) | SCENARIO DESCRIPTION |
|---|---|---|---|---|---|
| S1 | 0 0 | 1 1 | 1 1 | 1 1 | BEST CASE. Can be any set that is available - not valid. (Set 3) |
| S2 | 1 1 | 0 0 | 1 1 | 0 0 | BEST CASE. Can be any combination of sets that are available - not valid. (Set 0 or 2) |
| S3 | 1 1 | 1 0 | 1 1 | 1 1 | 2ND BEST CASE. Can be any set where the 1st Level cache is not valid. (Set 2) |
| S4 | 1 1 | 1 0 | 1 0 | 1 1 | 2ND BEST CASE. Can be any combination of sets where the 1st Level cache is not valid. (Set 2 or Set 1) |
| S5 | 1 1 | 1 1 | 1 1 | 1 1 | WORST CASE. All sets currently contain valid data in both 1st & 2nd Level caches. |

Thus, in reference to Table II, from the viewpoint of the "fill operation" it will be seen that situations S1 and S2 are the best case situations for the fill operation, since they indicate there are considerable areas involved in the first and second level caches which are invalid and thus available for a "fill" (or write-in) operation from main memory. The worst case situation is at S5 where all the sets of cache memory in both the Level 1 cache 19c1, and the Level 2 cache 19c2 contain "valid" data (V=1; R=1) and the problem becomes more complex as to which set of the cache memory group of sets should be deleted or overwritten in order to place in new data.

Situation S1: In this case, as seen in Table II for situation S1, it is noted that one of the sets, set 3, has been marked as invalid (0,0). This could occur in any one of the sets, namely, set 2, set 1, or set 0. However that may be, this is the best case situation since the choice is obvious of where to fill the cache which is to say that new data should be written into the invalid set shown as Set 3. By making this choice, then no good, valid data will be overwritten.

Situation S2: In this case, several of the sets have been marked as "invalid", namely set 2 and set 0. This is in a sense, identical to the best case situation as shown in situation 1. Here, no good data need ever be overwritten with new data. In this situation, the set that is picked out by the Smart-Fill method is the one that is most easily implemented, thus minimizing hardware. In this case, Set 2 or Set 0 would be candidates for being overwritten, since they contain invalid data, both in the first level cache and in the second level cache.

Situation S3: In this case, all of the cache sets have valid data (V=1) in the second level cache, that is to say, all of the valid status bits are "on" (on=1). However, it will be noted in situation S3 that the RBIT is off (R=0) in set 2, thus indicating that invalid data is sitting in the first level cache 19c1. Thus, here the choice for overwriting would be Set 2.

Situation S4: This situation is very close to the situation in situation S3, except that Set 2 and Set 1 show the status bit R=0, which means that the first level cache has invalid data. Thus here, it is possible to choose set 2 or set 1 for overwriting of new data, for the fill operation.

Situation S5: This is the worst case situation from the viewpoint of completing a fill operation. As seen, all sets of the cache memory are valid (=1, 1) in both the first level cache 19c1 and the second level cache 19c2. In this situation, the remaining choice to be involved would now be implemented via the random counter method.

A review of the above situations would suggest that there are 3 levels of priority choices to be made by the Smart-Fill method. The first choice is based on the Valid "V" status bit. If, at fill time for a given cache address location, the valid status bit of any set is off, (=0) then that location should be chosen for the fill operation. The second choice is based on the Reflection status bit "R". Here, if all of the sets are valid, then the choice should be to pick the set which has the "R" bit as off (=0). The third level of choice would be the default set where if all sets are valid (both "V" and "R") in both the first level and second level cache, then the best choice is to use the "random count" procedure as the selection criteria for choosing which set will be the one to be filled.

Smart-Fill Logic: The Smart-Fill logic is implemented with a fast programmable array logic device, often designated as a PAL, of FIG. 6 showing the cache fill control logic 16fa indicating the inputs and outputs of the logic. For the Smart-Fill method, the outputs of major importance are the SETSEL(1:0) bits which provide for the binary coded selection of particular ones of the cache sets of FIG. 4. In FIG. 4, each cache data unit is shown having an input line 16ss marked as the "Set Select". This "Set Select" is received from the output of the cache fill control logic 16fa of FIG. 6.

Shown below is Table III which gives the Smart-Fill set-selection choice for the first level priority choice. Likewise, Table IV gives the next level decision of set selection choice logic for the level 2 cache 19c2. If the Smart-Fill method using the Valid bit "V" and the Reflection bit "R" is not operative, then as seen in FIG. 1, the system uses the random count value procedure.

Thus, with reference to the Level (B2n) shown in FIG. 1, the Smart-Fill method operates to function with a first-level decision point which uses the "V" bit after which the decision is then made on the basis of a level 2 decision which uses the "R" bit. Table III shows the various conditions of the "V" bit in each of the four sets of the cache module, designated 3, 2, 1, 0. The validity bit status condition in each one of the sets of the cache module, will determine which set is selected, as seen in Table III. However, at the situation where all of the sets are valid (1111), then the decision point will go to level 2 in order to investigate the "R" bit. This is shown in Table IV. Here, whenever there is an invalid location, (R=0) that location may be selected for being overwritten, that is to say, filled up with new data. However, as seen at the bottom of Table IV, when the "R" bits are 1111, that is to say, each set of the cache has a Valid "R" bit, then the system will revert to the random selection process, as seen in Table IV.

TABLE III

LEVEL 1 DECISION BASED ON V BIT

| VBITn 3210 | SET SELECTED |
|---|---|
| 0000 | 0 |
| 0001 | 1 |
| 0010 | 0 |
| 0011 | 2 |
| 0100 | 0 |
| 0101 | 1 |
| 0110 | 0 |
| 0111 | 3 |
| 1000 | 0 |
| 1001 | 2 |
| 1010 | 0 |
| 1011 | 2 |

TABLE III-continued

LEVEL 1 DECISION BASED ON V BIT

| VBITn 3210 | SET SELECTED |
|---|---|
| 1100 | 0 |
| 1101 | 1 |
| 1110 | 0 |
| 1111 | GO TO LEVEL 2 |

TABLE IV

LEVEL 2 DECISION BASED ON R BIT

| RBITn 3210 | SET SELECTED |
|---|---|
| 0000 | 0 |
| 0001 | 1 |
| 0010 | 0 |
| 0011 | 2 |
| 0100 | 0 |
| 0101 | 1 |
| 0110 | 0 |
| 0111 | 3 |
| 1000 | 0 |
| 1001 | 2 |
| 1010 | 0 |
| 1011 | 2 |
| 1100 | 0 |
| 1101 | 1 |
| 1110 | 0 |
| 1111 | USE RANDOM |

The implementation of the Smart-Fill selection in building the SETSEL(1:0) values in the programmable array logic can be shown in a series of actual logic equations indicated in Table V. Table V has an upper portion which shows the least significant bit of the Set Select signal designated SETSEL(0). The lower portion of Table V shows the most significant bit designated SETSEL(1). It will be noted that each of the SETSEL signals is built as the "logical-OR" of four groups of terms. The first group is for the "hit" case which does not involve a fill operation. Here the set is selected based upon the MATCHn signals. (M0, M1, M2, M3). The next three groups in Table V are part of the "fill" logic. The first of the logic involves the "Level 1" selection using the Valid bits "V" bits. The second level of selection is level 2 which uses the Response bits "R" bits. The level 2 selection only applies if the level 1 operation cannot make a smart selection. Then finally, if the decisions on levels 1 and 2 are not operable, then the final group involves the use of the random count method.

TABLE V

| | | |
|---|---|---|
| SETSEL(0) = (LSB) | M1 * M0/ * M2/ * M3/ | "Hit" term |
| | + M3 * M0/ * M2/ * M1/ | "Hit" term |
| | + MISS * V3/ * V2/ * V1/ * V0 | "Fill" term - level 1 |
| | + MISS * V3/ * V2 * V1/ * V0 | "Fill" term - level 1 |
| | + MISS * V3/ * V2 * V1 * V0 | "Fill" term - level 1 |
| | + MISS * V3 * V2 * V1/ * V0 | "Fill" term - level 1 |
| | + MISS * VON * R3/ * R2/ * R1/ * R0 | "Fill" term - level 2 |
| | + MISS * VON * R3/ * R2 * R1/ * R0 | "Fill" term - level 2 |
| | + MISS * VON * R3/ * R2 * R1 * R0 | "Fill" term - level 2 |
| | + MISS * VON * R3 * R2 * R1/ * R0 | "Fill" term - level 2 |
| | + MISS * VON * RON * RCNT(0) | "Fill" term - random |
| SETSEL(1) = (MSB) | M2 * M0/ * M1/ * M3/ | "Hit" term |
| | + M3 * M0/ * M1/ * M2/ | "Hit" term |
| | + MISS * V3/ * V2/ * V1/ * V0 | "Fill" term - level 1 |
| | + MISS * V3/ * V2/ * V1/ * V0 | "Fill" term - level 1 |
| | + MISS * V3/ * V2/ * V1/ * V0 | "Fill" term - level 1 |
| | + MISS * V3/ * V2/ * V1/ * V0 | "Fill" term - level 1 |
| | + MISS * VON * R3/ * R2/ * R1/ * R0 | "Fill" term - level 2 |
| | + MISS * VON * R3/ * R2/ * R1/ * R0 | "Fill" term - level 2 |
| | + MISS * VON * R3/ * R2/ * R1/ * R0 | "Fill" term - level 2 |
| | + MISS * VON * R3/ * R2/ * R1/ * R0 | "Fill" term - level 2 |
| | + MISS * VON * RON * RCNT(1) | "Fill" term - random |

NOTES:
to aid in the readability of the logical equations:
(1) All terms in above equations are enabled (logical-and) with CKHITFF (not shown).
(2) In equations, VBITn are denoted as V0, V1, V2, V3.
(3) In equations, RBITn are denoted as R0, R1, R2, R3.
(4) In equations, MATCHn are denoted as M0, M1, M2, M3.
(5) In equations, term MISS is a define equal to (M0/ * M1/ * M2/ * M3/)
In equations, term VON is a define equal to (V3 * V2 * V1 * V0)
In equations, term RON is a define equal to (R3 * R2 * R1 * R0)
(6) In equations, following symbols apply:
* logical-and
+ logical-or
/ logical-inversion ('not')

In summary, the above described system and method provides the capability for a multiple-set structured cache design to complete the "fill" operation in an optimum fashion with great efficiency in all the possible levels of the cache functions. The Smart-Fill system presented herein does not require the addition of new hardware since the fast programmable array logic device was already existent in the computer network circuitry in order to provide a "hit" indicator. Thus, quite unlike the Least-Recently-Used (LRU) method, the present Smart-fill method does not require extra Tag RAM facilities to house the extra LRU bits which would normally be required. Thus, without the use of any extra hardware, the system enhances the cache hit rate by a factor of 5–10%.

While one particular embodiment of the Smart-Fill method has been described, it should be understood that other implementations may still fall within the concept of the invention as defined by the following claims.

What is claimed is:

1. A smart-fill system for selecting a cache address of a multi-set second level cache structure which will be utilized for a cache fill cycle, and wherein a central processor generates an index address to select a line of addresses across each set of said multi-set second level cache structure, said system comprising:
   (a) a small first level cache holding copies of a portion of address words and data words held in a second level cache;
   (b) a large second level cache structure having N sets of cache units wherein each addressed location selected by said central processor holds a word having an address index portion and two status bits, said status bits including:
      (b1) a valid status bit V to indicate validity (V=1) or invalidity (V=0) of said address index word in said second level cache;
      (b2) a Reflection bit R to indicate that the corresponding copy in said first level cache is valid (R=1) or invalid (R=0);
   (c) means to check, after a cache miss cycle, the value of V and R for each selected address index of each one of said N sets of cache units;
   (d) means to select, for a cache fill operation, that address index of the cache set which minimizes the probability of overwriting valid useful data in the said cache structure.

2. The system of claim 1 which includes:
   (a) means to randomly select an address in one of said N cache sets for a cache-fill operation after a cache-miss cycle when the value of V and R indicate there is no optimal choice of address index for the cache fill operation.

3. The system of claim 1 wherein said means to select includes:
   (a) programmable array logic means for reading the V status values and R status values of each selected address index in each set of said second level N cache units; including:
      (a1) means to select, for a cache fill operation, that particular address having the values of V=0 and R=0 as a first choice and V=1 and R=0 as a second choice.

4. The system of claim 3 wherein said programmable array logic means includes:
   (a2) means to detect multiple address hits during the same request cycle;
   (a3) means to generate an error signal to invalidate the ongoing cache request upon detection of said multiple hits.

5. An optimization system for a cache-fill cycle of a "N" multi-set cache structure having a small first-level cache and a large second-level cache, comprising:
   (a) a Tag RAM in said second level cache holding in each location, an address index word with two status bits, said status bits including:
      (i) a valid bit "V" which indicates the validity (V=1) or the invalidity (V=0) of the address index word;
      (ii) a Reflection bit "R" which indicates the validity (R=1) or invalidity (R=0) of a corresponding copy of said address index word in said first level cache;
   (b) means to select which particular address of which set of said N multi-set second level cache structure will be targeted for a cache-fill operation after a cache-miss, said means including:
      (i) first decision logic means to spot which address of a set of said Tag RAM have invalid data where V=0;
      (ii) second decision-logic means to spot which set of said Tag RAM has an invalid Reflection bit (R=0);
      (iii) means to fill a particular address location of the cache set which indicates the invalid bits (V=0) and (R=0).

6. The system of claim 5 wherein said means to select includes:
   (iv) random count generation means for sequencing count numbers 0 through N and including:
      (iva) means to select an address in cache set N which matches the count number occurring when said first and second decision-logic means indicate the selected addresses of that each one of the said N cache sets holds valid V bits (V=1) and valid R bits (R=1).

7. A method of utilizing a cache structure having a first level cache and a second level cache and for optimally selecting which cache set of N multi-cache sets of a second level cache is to be targeted for a data-fill operation, comprising the steps of:
   (a) initiating an address search in a first level cache and a second level cache to find address data requested by a processor;
   (b) selecting the cache set having the requested address (hit) for returning data to said requesting processor;
   (c) initiating a cache-fill operation cycle when said initiated address search indicates a "miss";
   (d) selecting, for a fill operation, a particular address of one of said N cache sets in said second level cache, which exhibits the lowest probability of overwriting valid cache data;
   (e) using a random number selection an address of one of said N cache sets in said second level cache for said fill operation, when all of the selected addresses in said cache sets indicate valid data still being held in each selected address location.

* * * * *